United States Patent [19]
Kivari et al.

[11] Patent Number: 5,291,542
[45] Date of Patent: Mar. 1, 1994

[54] MOBILE TELEPHONE HAVING A POWER-CONSERVING SUBROUTINE

[75] Inventors: Raimo Kivari, Haukipudas; Pertti Korhonen; Seppo Salonen, both of Oulu, all of Finland

[73] Assignee: Nokia Mobile Phones Ltd., Salo, Finland

[21] Appl. No.: 833,314

[22] Filed: Feb. 10, 1992

[30] Foreign Application Priority Data

Feb. 12, 1991 [FI] Finland .................................. 910670

[51] Int. Cl.$^5$ ........................ H04M 11/00; G06F 1/00
[52] U.S. Cl. ........................................ 379/58; 364/707
[58] Field of Search ..................... 370/50, 109; 379/58, 379/56, 59; 455/33.3, 38.3, 127, 343; 364/707

[56] References Cited

U.S. PATENT DOCUMENTS

| | | | |
|---|---|---|---|
| 4,544,924 | 10/1985 | French | 340/825.69 |
| 4,545,030 | 10/1985 | Kitchin | 364/900 |
| 4,570,219 | 2/1986 | Shibukawa et al. | 364/200 |
| 4,758,945 | 7/1988 | Remedi | 364/200 |
| 4,823,292 | 4/1989 | Hillion | 364/707 |
| 4,851,987 | 7/1989 | Day | 364/200 |
| 4,980,836 | 12/1990 | Carter et al. | 364/483 |
| 5,025,387 | 6/1991 | Frane | 364/493 |
| 5,117,449 | 5/1992 | Metroka et al. | 379/58 |
| 5,148,471 | 9/1992 | Metroka et al. | 379/58 |

FOREIGN PATENT DOCUMENTS

0343528 11/1989 European Pat. Off. ....... H04M 1/72

OTHER PUBLICATIONS

Review of the Electrical Communication Laboratories, vol. 35, No. 2, Mar. 1987, Tokyo Japan, pp. 109–114, Yuki et al., "Design Considerations for Mobile Radio Units Used in High-Capacity Land Mobile Communications System".

Hewlett Packard Jounal, vol. 3, No. 6, Jun. 1983, Palo Alto, Calif., pp. 10–15, E. Brooks et al., "High Capacity Electronics System for a Compact, Battery Operated Computer".

Electronics International, vol. 53, No. 21, Sep. 1980, New York, pp. 123–126, Smith et al. "C-MOS Microprocessor Wakes Itself Up".

Patent Abstracts of Japan, vol. 9, No. 061 (E-303) Mar. 19, 1985, JP59200537 (Nippon Denshin Denwa Kosha).

*Primary Examiner*—Curtis Kuntz
*Assistant Examiner*—William D. Cumming
*Attorney, Agent, or Firm*—Perman & Green

[57] ABSTRACT

A circuit arrangement for a mobile telephone comprises a microprocessor responsive to a clock signal for controlling its functions, and a signalling circuit, e.g. a modem which is coupled to the microprocessor to provide an output clock signal thereto. In the idle states of the processor, the output clock signal is stopped, using a stop signal from the microprocessor. This gives use to reduce power consumption and a consequential increase in battery life.

6 Claims, 2 Drawing Sheets

MOBILE TELEPHONE HAVING A POWER-CONSERVING SUBROUTINE

FIELD OF THE INVENTION

The invention relates to a circuit arrangement for a mobile telephone, said telephone including a microprocessor for the control of the function of the telephone and a signalling circuit which generates a clock signal. A mobile telephone is understood to mean, in this context, a mobile telephone which is customarily used in, for example, the Nordic mobile telephone network (NMT) or in the British (TACS) and North-American (AMPS) networks.

BACKGROUND OF THE INVENTION

The reduction of the size and weight of the telephone, and thus in Particular the size and Weight of the batteries which serve as the source of power, without, however, shortening the time that the telephone can be used without having to recharge the battery, has Presented a continuous challenge in developing the usability of radio telephones. The time that a telephone with batteries of the same size can be used before it needs to be recharged can be lengthened if the consumption of current is reduced. For this purpose, numerous circuits have been developed by means of which, for example, the efficiency of the source of current has been improved and/or the consumption of current by the other circuits in the telephone have been somewhat reduced.

In general, the circuits referred to above are placed in a current-saving state when in an idle state, for example the operation of the microprocessor can be stopped. The circuits are reactivated by a suitable external control signal. Such a signal may be, for example, a receive or interrupt signal coming from a signalling circuit. With this procedure, however, an optimal saving of current is not achieved, since in general a circuit in a current-saving state will still receive a clock signal regardless of the internal state of the circuit. The clock signal is normally a high-frequency signal, for example of the order of megahertz and the output butter generating the clock signal consumes current.

SUMMARY OF THE INVENTION

The invention is based on the observation that in the circuits, especially in the microprocessor controlling the operation of a telephone, there appears also during the active operating state a large number of periods during which the circuits are "idle", i.e. during which they do not have an immediate function to perform.

According to the present invention, there is provided a circuit arrangement for a mobile telephone comprising a microprocessor responsive to a clock signal for controlling the telephone function, and a signalling circuit coupled to the microprocessor to provide an output clock signal thereto characterised in that the microprocessor is conditioned to provide a stop signal at a processor output in response to an idle state mode, said stop signal being applied to a control input of the signaling circuit such that the output clock signal of the signalling circuit is stopped. This has the advantage that when the output clock signal is stopped, since no changes of state occur, the consumption of current by this output buffer is reduced, and additionally, this may reduce current consumption by circuits controlled by the signalling circuit.

In a preferred embodiment, the signalling circuit is operable to provide a delay in the signalling circuit between receipt of the stop signal and stopping of the output clock signal. The processor may be operable to stop its functions during the delay and before the output clock signal is stopped, whereby the delay is chosen long enough such that the processor can stop its functions before the output clock signal stops. This has the advantage that because the output clock signal is interrupted in intervals laying within the intervals of the processor stops, the clock signal stops have no influence upon the processor. Thus, a dynamic processor can be used. The clock of a dynamic processor cannot be stopped during normal operation of the processor without the memory location bits being lost.

The signalling circuit may be a modem.

DESCRIPTION OF THE DRAWINGS

The invention is described below, by way of example only, with reference to the accompanying drawing.

DETAILED DESCRIPTION OF THE INVENTION

Figure 1:
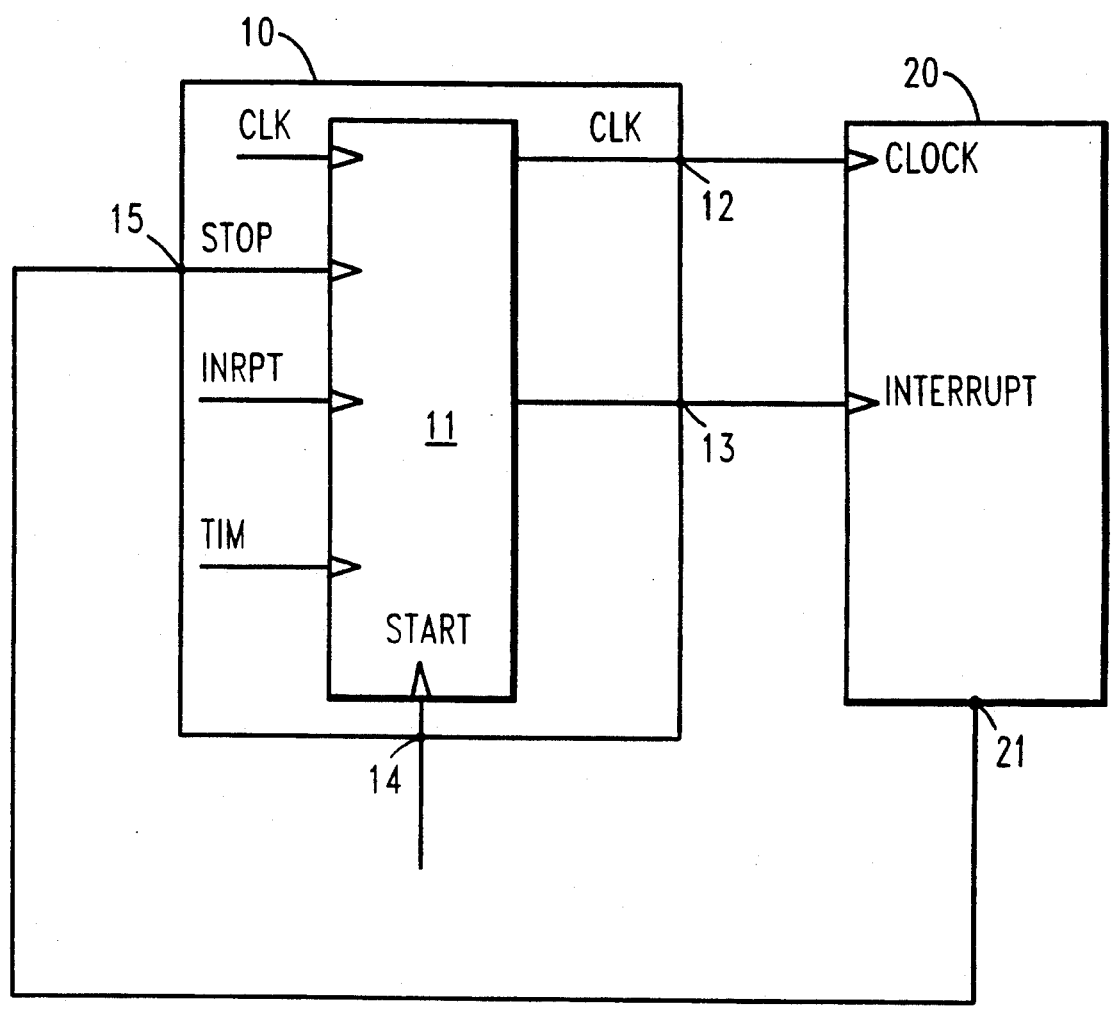
FIG. 1 depicts in the form of a schematic block diagram, the main features of a circuit arrangement in accordance with the present invention.
Figure 2:
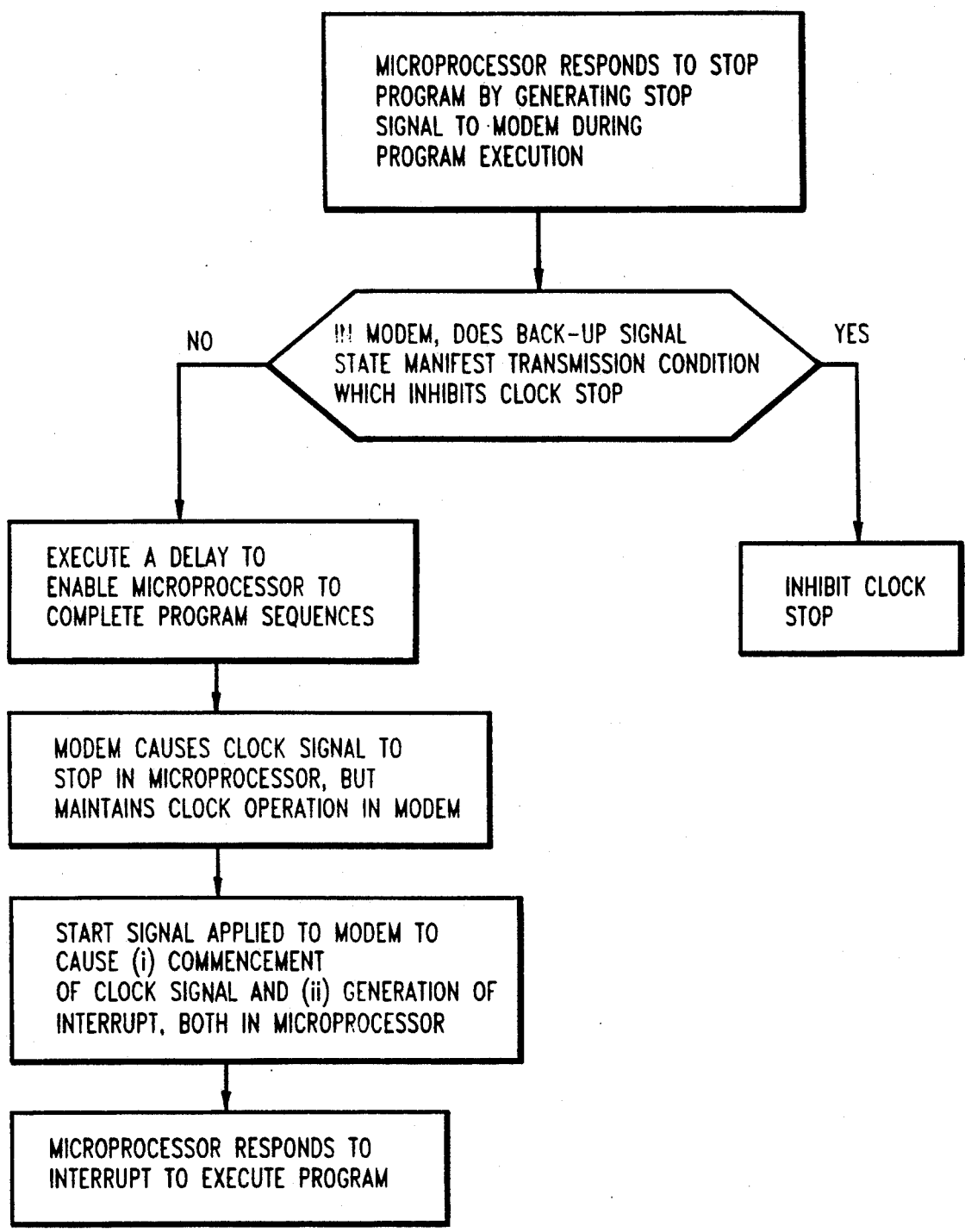
FIG. 2 depicts a flow diagram that illustrates a power consumption reduction method in accordance with the invention hereof.

In an NMT or TACS/AMPS mobile telephone the essential features in terms of the invention are a modem 10, serving as a signalling circuit a-nd having a block 11, and a microprocessor 20 controlling the operation of the telephone. By suitable system architecture the functions of the processor 20 can, in certain situations, be stopped for the duration of tens of milliseconds, during those periods when the processor 20 is idle. During this time, of course, the processor 20 needs no clock signal. When the clock signal CLOCK of the processor 20 is led from the output connection 12 of the modem circuit lo, the output clock signal CLK output from the modem circuit 10 can be stopped for a length of time suitable for either the 0 state or the 1 state. A saving of current is achieved by stopping the output clock signal MA, since changes of state of the connecting tag 12 consume current but the static state does not.

The processor 20 comprises a suitable clock stop programme block by means of which the processor clock CLOCK can be Stopped. When predetermined conditions are fulfilled, the stop program will generate a stop signal in the processor output 21. This signal is applied as stop signal STOP to the control input 15 of the modem circuit 10. Thereupon the modem 10 will stop its output clock signal CLK and subsequently, after a certain delay, the processor clock CLOCK, in order for the processor 20 to have time to complete any necessary program sequences, i.e. to pass to the stop state in a controlled manner. The delay may be, for example, 30–55 microseconds. When processor functions are again needed, the modem 10 will start, by means of the start signal, the clocking of the processor 20, and will at the same time apply to the processor 20 via the interruption line 13 an interrupt signal INTERRUPT, on the basis of which the processor 20 will begin to execute its programs in a normal manner.

For the modem start signal referred to above there is used either an input interrupt signal INRPT in the TACS/AMPS system or an internal timing signal TIM in the NMT system. The timing signal TIM will start after a predetermined stoppage of the processor. The length of the stop state of the processor 20 may be, depending on the case, 45-220 milliseconds.

Inside the modem 10 there are additionally provided back-ups by means of which the stopping of the output clock signal CLK is prevented in any interference situations which may occur. The back-up may be implemented, for example, using a separate monitoring logic which observes predetermined environmental variables and, upon the fulfillment of predetermined conditions, prevents the stopping of the output clock signal CLK. Alternatively the stopping of the output clock signal CLK can be prevented by an external signal, which is represented by the signal START connected to a modem input connection 14. The same START signal could also be used for the starting of the processor 20 controlled by external circuits, so that activation of the clock CLK will automatically follow the activation of the START signal. INTERRUPT is activated either at the same time automatically or by means of an additional external logic.

The output clock signal CLK may be the clock signal CLOCK of the processor 20, the processor 20 being operable to stop when the output clock signal CLK stops and to start when the output clock signal CLK starts.

In an example arrangement, the saving achieved in the connecting tag 12 of the modem 10 is about 1.1-2.1 mA, depending an the load connected to the tag (in the example, within the range 0-40 pF).

The clock stop function can also be used in cases in which the clock signal CLOCK of the processor 20 is led from a circuit Other than the modem 10, and the output clock signal CLK of the modem 10 is used as the clock for some other circuits. In this case the processor 20 may write an instruction for stopping the output clock signal CLK by a STOP signal given via connections 21 and 15 and for starting the output clock signal CLK, for example, by a START signal given via the connection 14 of the modem 10. By such a procedure it is possible, when so desired, to limit via the processor 20 the current consumption caused by the clock signal and, additionally, to control the operation of the circuits connected to the clock line 12.

In view of the foregoing description it will be evident to a person skilled in the art that various modifications may be made within the scope of the present invention.

We claim:

1. A method for reducing power consumption of a signaling circuit in a mobile telephone, said telephone including a microprocessor and a connected signaling circuit for generating a clock signal to said microprocessor, the method comprising:

applying a stop signal from said microprocessor to a first control input of said signaling circuit;

applying a back-up signal to said signalling circuit, for controlling operation of said signalling circuit in response to said stop signal;

ceasing generation of said clock signal from said signalling circuit to said microprocessor in response to said stop signal, but only after passage of a delay time that commences with application of said stop signal and in an absence of said back-up signal;

stopping internal functions of said microprocessor concurrently with application of said stop signal to said signalling circuit, said internal functions of said microprocessor ceasing operation within said delay time so that said internal functions have stopped when generation ceases of said clock signal;

continuing clock-controlled functions within said signalling circuit to enable a restarting of said microprocessor;

applying an interrupt signal to said microprocessor form said signalling circuit, to effect a restarting of internal functions of said microprocessor; and commencing generation of said clock signal to said microprocessor in response to a start signal.

2. A method according to claim 1 wherein, upon said applying of the interrupt signal from said signalling circuit, said method commences generation of said clock signal by operation of said signalling circuit.

3. A method according to claim 1, wherein said microprocessor receives both said interrupt signal and said clock signal from said signalling circuit.

4. A method according to claim 1, wherein said signalling circuit includes control logic which, in response to a back-up signal state indicative of a predetermined transmission condition, prevents a cessation of generation of said clock signal.

5. A method according to claim 1, wherein said clock signal from said signalling circuit is also employed as a clock signal by said microprocessor, said microprocessor controlled to stop when said signalling circuit clock signal ceases generation and to start when said signalling circuit commences generation of said clock signal.

6. A method according to claim 5, wherein said delay time occurs in said signalling circuit between a reception of said stop signal and the cessation of generation of said clock signal, thereby enabling said microprocessor to perform to completion any predetermined program sequence prior to stopping.

* * * * *